UNITED STATES PATENT OFFICE.

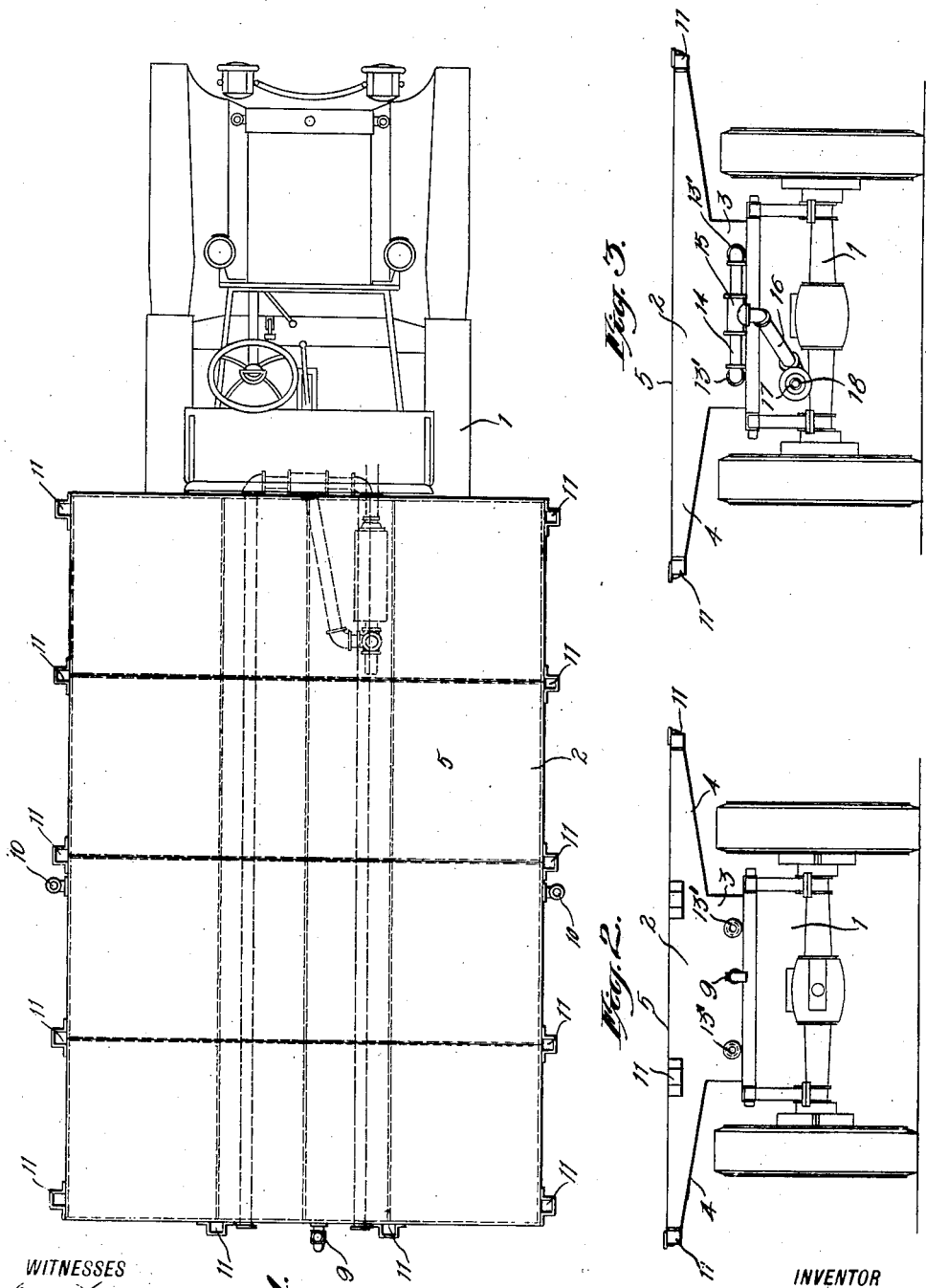

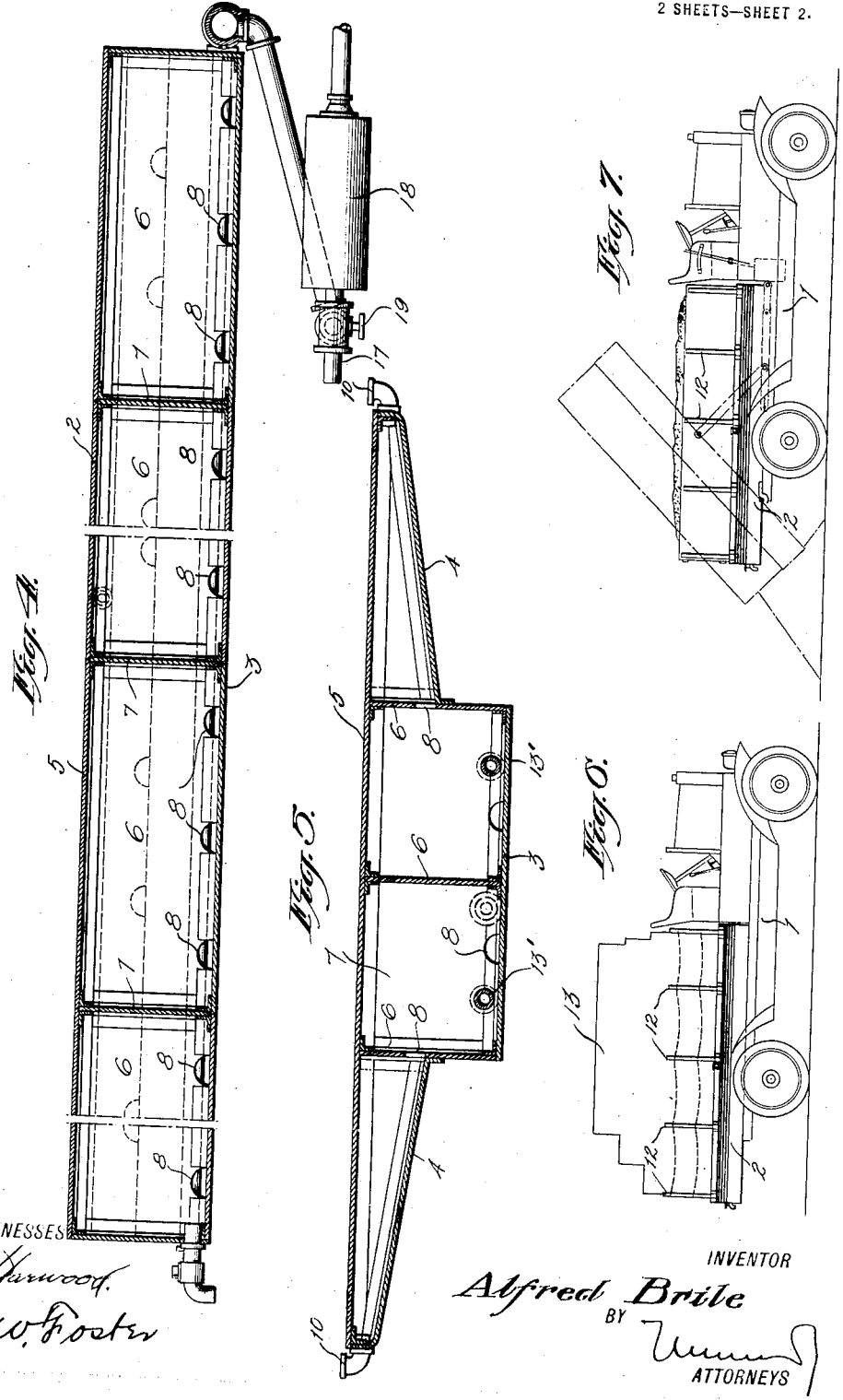

ALFRED BRILE, OF CASPER, WYOMING.

TANK.

1,400,345.

Specification of Letters Patent.   Patented Dec. 13, 1921.

Application filed February 6, 1920.   Serial No. 356,684.

*To all whom it may concern:*

Be it known that I, ALFRED BRILE, a citizen of the United States, and a resident of Casper, in the county of Natrona and State of Wyoming, have invented a new and Improved Tank, of which the following is a full, clear, and exact description.

This invention relates to improvements in tanks, an object of the invention being to provide a tank adapted to contain liquids and which is mounted on an automobile truck and forms, in effect, a loading bed on which other materials or articles can be conveniently carried.

In other words, my invention resides in the provision of a tank which, while conveniently supporting a large quantity of liquid, is of low center of gravity and has an extended upper surface which may be conveniently utilized as a loading bed when the tank is empty, thus enabling the truck to be conveniently employed for hauling oil or other liquid in one direction and returning in the other direction with a load of other material on top of the empty tank.

A further object is to provide a tank of the character stated which utilizes otherwise lost space for hauling fuel, oil or other liquid, which need not be removed in hauling freight other than fuel, which can be built in any desirable shape and form for hauling freight as well as liquid, and which provides means for heating the liquid in cold weather.

A further object is to provide a tank of the character stated which will be relatively light and which will set low on the truck, which will not contaminate other articles on the top of the tank by the liquids within the tank, and which may be mounted in any desired way on the truck and may be employed as a tilting or dumping body as desired.

With these and other objects in view the invention consists in certain novel features of construction, and combinations and arrangements of parts, as will be more fully hereinafter described and pointed out in the claim.

In the accompanying drawings—

Figure 1 is a top plan view illustrating my invention;

Fig. 2 is a rear end view;

Fig. 3 is a front end view;

Fig. 4 is a broken view in longitudinal section through the center of the tank;

Fig. 5 is a view in transverse section through the tank;

Fig. 6 is a view in side elevation illustrating my improvements when a load is supported on the tank; and Fig. 7 is a view illustrating a modification showing the tank when employed as a dumping body.

1 represents a truck and 2 my improved tank which is supported on the truck and constitutes a loading bed. The tank 2 is composed of metal having a relatively deep intermediate portion 3 and relatively shallow extensions 4 at both sides thereof with a flat horizontal platform 5 covering both the intermediate portion and the extensions. The entire tank is, as a matter of fact, relatively shallow, but the intermediate portion is appreciably deeper than the extensions 4 at the sides thereof and the bottoms of said extensions are inclined both for strength and for the purpose of draining into the deeper intermediate portion.

Longitudinal and transverse partitions 6 and 7 divide the tank into a number of compartments and these partitions, of course, likewise add strength and support to the platform 5. Openings 8 are provided in the partitions 6 and 7 so that the compartments communicate with each other and have common access to an outlet cock 9 at the rear lower portion of the tank. It is obvious that these openings might be provided with suitable closures so as to enable the tank to contain different liquids in the several compartments, and inlet elbows 10 are provided at the sides of the tank as a convenient location for said inlets to facilitate the filling of the tank.

The essential feature of the shape of the tank is to provide a relatively low, hollow liquid receptacle which has an upper platform 5 which constitutes a loading bed for the truck and yet provides ample space in the tank for the accommodation of liquid to the hauling capacity of the truck. The tank therefore not only operates as a receptacle for the liquid, but also as a loading bed and can be removably or permanently mounted on the truck as may be desired, and may maintain a stationary position or be mounted so as to tilt or dump, as shown clearly in Fig. 7.

Angle brackets 11 are provided at the sides and rear end of the tank to receive posts or partitions 12 to facilitate the mounting or support of a load 13 on top of the tank.

To provide heat for the liquid of the tanks I preferably locate pipes 13' in the bottom of the tank extending entirely through the tank longitudinally and connected at their forward ends by a horizontal pipe 14, coupling 15, short pipe 16, and exhaust pipe 17 of the truck, and conveniently locate said connection near the exhaust muffler 18 and provide a cock or valve 19 which controls the flow of the exhaust gases through the pipes 13'. In extremely cold weather, it is desirable to open this cock 19 and allow the exhaust from the engine to escape through the pipes 13' to heat the liquid, and, of course, in warmer weather the cock or valve 19 will be closed. In carrying such liquids as gasolene, very little or no heat is necessary and the heating of the liquid is entirely within the control of the operator for this reason.

When a truck is equipped with my improved tank, it is capable of carrying both liquids and the ordinary load without the necessity of changing the truck in any way and while, of course, when the tank is full of liquid, it is not desirable to provide another load, still, on the other hand, most trucks are used for hauling liquids in one direction and must return empty to the starting point and my improved truck permits the use of the same for hauling liquids in one direction and a load of another character in the reverse direction, thus giving full utility to the same.

Various slight changes might be made in the general form and arrangement of parts described without departing from the invention, and hence I do not limit myself to the precise details set forth, but consider myself at liberty to make such changes and alterations as fairly fall within the spirit and scope of the appended claim.

I claim:

The combination with the chassis of an automobile truck, of a tank supported thereon and comprising a deep center section including a bottom and vertical side and end walls, a pair of shallow lateral sections each including an inclined bottom wall extending laterally from the side of the tank and secured at its inner end to the vertical side wall of the tank, and a common flat top for said center section and said lateral sections resting upon the vertical wall of the center section and secured thereto and secured along its marginal edges to the outer ends of the inclined walls of said lateral sections whereby the portions of the top which project beyond the center section, the vertical side walls and the inclined bottom walls of the lateral sections are organized to form a truss so that the flat top common to the sections of the tank constitutes a loading bed for the truck.

ALFRED BRILE.